Patented May 24, 1927.

1,629,873

UNITED STATES PATENT OFFICE.

HEINRICH JENSCH, OF HOCHST-ON-THE-MAIN, GERMANY, ASSIGNOR TO I. G. FARBEN-INDUSTRIE AKTIENGESELLSCHAFT, OF FRANKFORT-ON-THE-MAIN, GERMANY.

ACRIDINE DERIVATIVES AND PROCESS OF MAKING SAME.

No Drawing. Application filed September 3, 1921, Serial No. 498,440, and in Germany July 8, 1919.

I have found that new acridine derivatives of great therapeutical value, owing to their bactericidal action, can be obtained by introducing into the 9-position of acridines (acridine, its derivatives and substitution products) the amino group and the residues of primary and secondary amines which are not aryl amines. The new compounds correspond to the general formula

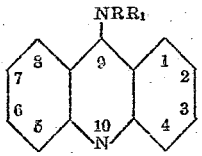

wherein R and $R_1$ stand for hydrogen or residues which are not aryl groups and wherein the acridine residue may be unsubstituted or substituted by atoms or atomic groups such as, for instance, halogen atoms and amino, nitro, alkyl and alkyloxy groups.

The introduction of the $NRR_1$ group may be accomplished by causing ammonia or primary or secondary amines which are not aryl amines to act upon 9-halogen acridines or upon 9-$R_2O$ acridines, $R_2$ standing for a hydrocarbon radicle, in the presence or absence of a catalyst such as, for instance, a copper salt, and in the presence of a solvent. The solvent may be alcohol or an equivalent of alcohol, or an excess of the substituted amine. There may also be obtained amino-substituted 9-amino acridines by reducing the respective nitro derivatives.

Examples.

(1) 14 parts of 2-ethoxy-9-chloracridine are heated for several hours to 100° C. with 6 parts of ethanolamine and 20 parts of absolute alcohol. The yellow crystalline mass which separates and which constitutes the yellow hydrochloride of the new base, is filtered and recrystallized from diluted alcohol; it is readily soluble in water, rather difficultly soluble in alcohol. From the product thus obtained the 2-ethoxy-9-ethanol-aminoacridine is isolated by means of ammonia. This compound is yellow, insoluble in water and, when crystallized from diluted alcohol, melts at 146°.

(2) There are heated together for 8–9 hours to 100° C. 13 parts of 2-ethoxy-9-chloracridine, 7 parts of p-hydroxyphenyl-ethylamine and 60 parts of alcohol. From the solution thus obtained the new yellow base separates on addition of ammonia. In order to free the base from any chloracridine it may still contain, it is boiled with benzene and then crystallized from alcohol; it melts at 233°. When combined with hydrochloric acid or sulphuric acid, it forms salts which are soluble with difficulty; when combined with glycolic acid it forms a readily soluble salt which melts at 208° C.

(3) 20 parts of 2-ethoxy-9-chlor-acridine and 16 parts of 4-aminoantipyrine are boiled in a reflux apparatus with 200 parts of alcohol. The reaction is complete in a short time and, on cooling, the hydrochloride of the 2-ethoxy-9-antipyrylamino-acridine separates. It is isolated from the mother liquor and recrystallized from alcohol; it is readily soluble in water. On addition of ammonia there separates from it the yellowish red free base, which is insoluble in water and in most of the usual organic solvents; when crystallized from pyridine it melts at 257° C.

(4) 7 parts of 9-chloracridine are heated for 5 hours to 140° with 50 parts of an alcoholic solution of ammonia of 12% strength and some copper acetate. Some acridone which is thus formed is then filtered off and the solution is evaporated on the water bath. The residue is dissolved in dilute hydrochloric acid and from this solution the 9-aminoacridine is precipitated by adding sodium carbonate. It crystallizes from dilute alcohol as yellow needles melting at 236° C.; it is readily soluble in dilute hydrochloric acid, the hydrochloride being separated by an excess of hydrochloric acid.

(5) 20 g. of 2-ethoxy-9-chloracridine are heated for 6 hours to 130–140° with 30 c. cm. of alcohol and 25 gr. of diethyl amine while adding some cuprous chloride and copper bronze. After cooling, some ethoxy-chloracridine which is unconverted is filtered off and the filtrate is supersaturated with hydrochloric acid, whereupon the hydrochloride of the new base separates in the form of a red crystalline powder. In order to purify it, it is dissolved in alcohol and precipitated from the solution by adding ether. The product is readily soluble in water to an orange-red solution; it melts at 177° having previously sintered. The base which can be obtained from it is a thick oil.

(6) 20 gr. of 2 ethoxy-9-chloracridine are heated for about 4 hours to 110–115° C. with 30 c. cm. of alcohol and 10 gr. of piperidine while adding some cuprous chloride and copper bronze. After cooling the crystalline mass which separates is filtered off and extracted with very dilute acetic acid. By adding ammonia to the acetic acid solution the new base is precipitated; after recrystallization from diluted alcohol it melts at 122°. By dissolving the base in alcohol, acidifying with hydrochloric acid and adding acetone, the corresponding hydrochloride is obtained which dissloves in water to an orange-red solution and melts at 252° while decomposing.

The 9-chloroacridine and derivatives thereof, for example 2-ethoxy-9-chloracridine may be obtained from the corresponding acridones and also directly from the corresponding arylanthranilic acids by heating them with phosphorous pentachloride or phosphorous oxychloride.

(7) 10 parts of 9-ethoxy-acridine are boiled with 50 parts of an alcoholic solution of ethylamine of 20% strength or, which is preferable, the mixture is heated for ½ hour under pressure to 120°. The solution thus obtained yields on evaporation the 9-ethyl-amin-acridine as an oil which soon solidifies; when crystallized from dilute alcohol it melts at 129°.

The 9-RO-acridine derivatives can be produced by causing alkali alcoholates or phenolates to act upon 9-halogen-acridine derivatives, the 9-ethoxyacridine thus obtained melts at about 83° and is easily converted into acridone by heating with a mineral acid. 2:9-di (ethoxy) acridine crystallizes from acetone and a small quantity of water in the form of fine needles; it melts at 83° C.

(8) 10 parts of 9-ethoxy-acridine are heated for several hours to 120° with 100 parts of an alcoholic solution of ammonia of 10% strength. Some acridone which may be formed is filtered off and the solution is mixed with hydrochloric acid in order to isolate the 9-aminoacridine in the form of a hydrochloride.

(9) By nitrating 9-aminoacridine in conc. sulphuric acid a dinitro-9-aminoacridine is obtained the sulfate of which is difficultly soluble in water. The muiclaginous base isolated therefrom by adding ammonia turns crystalline when the ammonical solution is boiled for a rather long time; it forms red flocks which are insoluble in water, alcohol and ether; it melts at above 300° while decomposing. In order to reduce it, 28 gr. of the dinitro base, triturated with 135 gr. of stannous chloride, are introduced into 150 c. cm. of hydrochloric acid of 37% strength. After termination of the reaction which proceeds with rise of temperature to 80°, the mass is cooled to 0° C. and the tin double-salt which separates is filtered off. It is dissolved in a small quantity of water and free from the tin by means of sulphuretted hydrogen and the filtered solution is evaporated. On cooling it crystallizes, thus yielding the hydrochloride of the triamino-acridine as long yellow needles. The separated free triaminoacridine forms dark-red laminæ which are soluble in water.

(10) By causing 4.2-nitro-chlorobenzoic acid to react with aniline the 5-nitro-diphenylamine-2-carboxylic acid is obtained (see Ullmann A. 355–363) and from the latter by elimination of water the 3-nitro-acridone (see Ullmann A. 355.363/64); by treating this latter with phosphorous pentachloride the 3-nitro-9-chloracridone is produced which crystallizes from benzene as yellow needles melting at 213° C. If this compound is heated with alcoholic ammonia to 130°, the 3-nitro-9-aminoacridine is obtained which melts at above 300° with decomposition. By reducing this compound by means of stannous chloride in conc. hydrochloric acid or by means of ferrous sulphate in presence of ammonia, the 3:9-diamino-acridine is obtained the hydrochloride of which forms lemon-coloured crystals readily soluble in water. On addition of caustic soda solution the solution of the hydrochloride becomes turbid whereupon yellow flocks of the free diamino acridine separate. In the place of stannous chloride other reducing agents may be used, for inst. iron or ferrous sulphate, and ammonia.

(11) By causing 2.4-chlornitrobenzoic acid to react with p-phenetidine the 2.p-phenetidino-4-nitro-benzoic acid is obtained, which crystallizes from alcohol and melts at 233–234°; this acid yields the 3:7:9-nitro ethoxy chlor-acridine, which crystallizes from benzene and melts at 186–187° C., by splitting off water and treating the acridone derivative thus produced with phosphorus pentachloride. If this acridine derivative is heated with alcoholic ammonia, the 3:7:9-nitro-ethoxy-amino-acridine is obtained which when crystallized from nitrobenzene melts at 310° it is obtainable in two forms, one red and the other yellow. 20 gr. of this nitro amino derivatives are mixed and stirred with 300 gr. of glacial acetic acid and there is then added all at once a solution of 48 gr. of stannous chloride in 160 c. cm. of hydrochloric acid. The yellow compound which then gradually separates is heated for two hours to 60–70° C. filtered off, washed consecutively with glacial acetic acid and ether and finally treated with caustic soda solution. Thus the 3.9.7-diaminoethoxyacridine is obtained which is difficultly soluble in cold water and melts at 123–124° C. while decomposing.

As stated at the beginning of the specification the new compounds of this invention contain the group—$NRR_1$ in which R and $R_1$ stand for hydrogen or residues which are not aryl groups. In the appended claims I have defined the group—$NRR_1$ as being a group in which R and $R_1$ stand for hydrogen or aliphatic residues it being understood that under the expression "aliphatic residues" I intend to include aliphatic residues in which the hydrogen atoms thereof may be replaced also by aryl groups.

Having now described my invention, what I claim is:

1. Process of preparing derivatives of meso-amino-acridines which comprises treating at elevated temperatures with a body of the formula $NHRR_1$, in which R and $R_1$ stand for hydrogen or aliphatic residues or both, acridines having a substituent in the 9-position thereof replaceable by the $NRR_1$ residue of said body, in the presence of a solvent.

2. Process of preparing therapeutically active derivatives of the meso-amino-acridines, which comprises treating 9-halogen-acridines with a body of the formula $NHRR_1$, in which R and $R_1$ stand for hydrogen or aliphatic residues or both, at elevated temperatures, in the presence of a solvent.

3. As new products, the derivatives of 9-amino acridine of the general formula:

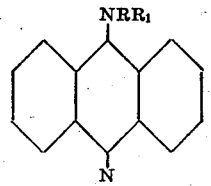

in which R and $R_1$ stand for hydrogen or aliphatic residues or both.

4. As new products, the bodies of the general formula:

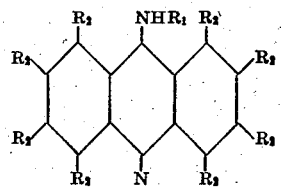

wherein $R_1$ stands for hydrogen or an aliphatic residue and at least one $R_2$ stands for an amino group while the others stand for an amino group, an ether radicle, an alkyl group, a halogen atom or hydrogen.

5. As a new product, 3.9.7-diamino-ethoxy-acridine, being a yellow compound, sparingly soluble in hot water, soluble in alcohol and acetone, melting at 123–124° C. and forming with hydrochloric acid a yellow hydrochloride difficultly soluble in cold water.

In testimony whereof, I affix my signature.

HEINRICH JENSCH.